United States Patent
Hirono et al.

(10) Patent No.: US 7,618,716 B2
(45) Date of Patent: Nov. 17, 2009

(54) WAVE PLATE

(75) Inventors: Tatsuya Hirono, Tokyo (JP); Masayuki Sekiguchi, Tokyo (JP)

(73) Assignee: JSR Corporation, Tokyo (JP)

( * ) Notice: Subject to any disclaimer, the term of this patent is extended or adjusted under 35 U.S.C. 154(b) by 302 days.

(21) Appl. No.: 10/581,524

(22) PCT Filed: Dec. 3, 2003

(86) PCT No.: PCT/JP03/15464

§ 371 (c)(1), (2), (4) Date: Dec. 26, 2006

(87) PCT Pub. No.: WO2005/054911

PCT Pub. Date: Jun. 16, 2005

(65) Prior Publication Data

US 2007/0164262 A1 Jul. 19, 2007

(51) Int. Cl.
*B32B 27/00* (2006.01)
*B32B 27/08* (2006.01)
(52) U.S. Cl. ...................................... 428/515; 428/500
(58) Field of Classification Search ........................ None
See application file for complete search history.

(56) References Cited

U.S. PATENT DOCUMENTS

| 6,447,868 | B1 | 9/2002 | Sekiguchi et al. |
| 7,008,569 | B2 | 3/2006 | Sekiguchi et al. |
| 2004/0047056 | A1 | 3/2004 | Sekiguchi et al. |
| 2004/0242823 | A1 | 12/2004 | Sekiguchi et al. |
| 2006/0027322 | A1 | 2/2006 | Sugiyama et al. |

FOREIGN PATENT DOCUMENTS

| JP | 5-27118 | 2/1993 |
| JP | 11-39705 | 2/1999 |
| JP | 2000 314885 | 11/2000 |
| JP | 2001-124925 | 5/2001 |
| WO | 02 088783 | 11/2002 |

OTHER PUBLICATIONS

U.S. Appl. No. 10/581,523, filed Jun. 2, 2006, Sekiguchi, et al.
U.S. Appl. No. 10/547,673, filed Sep. 2, 2005, Ushino, et al.
U.S. Appl. No. 10/581,201, filed Jun. 1, 2006, Ushino, et al.

*Primary Examiner*—Sheeba Ahmed
(74) *Attorney, Agent, or Firm*—Oblon, Spivak, McClelland, Maier & Neustadt, L.L.P.

(57) ABSTRACT

A wavelength plate, which comprises a cyclic olefin based resin-containing material and is obtained by combining plural sheets of a retardation film that provides a specific retardation. The resulting wavelength plate (retardation plate) has the same polarizing characteristics against monochromic lights having a different wavelength and can be used as a wavelength plate for optical information recording and reproducing devices.

6 Claims, No Drawings

WAVE PLATE

TECHNICAL FIELD

The present invention relates to a wavelength plate having a function as a quarter wavelength plate (circular polarizing plate) against monochromic lights having a different wavelength, which is a wavelength plate comprising a combination of the plural number of sheets of a resin film that provides a retardation to transmitted light (this resin fill will be referred to as "retardation film" in the invention) and which can be used in optical information recording and reproducing devices and the like. Also, the invention relates to a wavelength plate having a function as a half wavelength plate against monochromic lights having a different wavelength, which is a wavelength plate comprising a combination of plural retardation films and which can be used in optical information recording and reproducing devices and the like.

BACKGROUND ART

An optical disk device utilizing laser beams (monochromic lights) is an optical information recording and reproducing device which has recently extended largely because of noncontact, a large quantity of information per unit volume, high-speed access properties or low costs, and various recording media are developed while utilizing such characteristic features. For example, there have been developed compact disk (CD), laser disk (LD), CR-ROM, DVD-ROM, and the like, which reproduce previously recorded information as sounds, images or computer programs; CD-R and DVD-R which can write information only one time by laser and reproduce the information; and magneto-optical disk (MO), DVD-RAM, DVD-RW, and the like, which can perform repeated recording and reproduction of information.

As an optical device for recording and/or reproducing information in such an optical information recording and reproducing device, there is known an optical pick-up device in which a polarizing beam splitter (PBS) and a quarter wavelength plate (QWP) are aligned in the middle of an optical path from a laser beam source to an optical detector.

The quarter wavelength plate as referred to herein is one that provides a $\lambda/4$ optical path difference (accordingly, a retardation of $\pi/2$) between polarizing components having a wavelength of $\lambda$ and intersecting each other.

In the foregoing optical pick-up device, linearly polarized light (S wave) is irradiated from a laser beam source, passes through the PBS and then passes through the quarter wavelength plate, whereby the linearly polarized light becomes circularly polarized light, and the circularly polarized light is then irradiated to an optical recording medium by a condenser lens. It is constructed in such a manner that return light which has been reflected from the optical recording medium again follows the same course and passes through the quarter wavelength plate, whereby the azimuth of the circularly polarized light is converted by 90 degrees and the circularly polarized light becomes linearly polarized light (P wave), and the linearly polarized light then passes through the PBS and is guided into an optical detector.

As a rewritable type magneto-optical disk device, there is known one in which a half wavelength plate is aligned in the middle of an optical path wherein irradiated light from a laser beam source passes through a polarizer and PBS and is irradiated to a magneto-optical disk, and return light which has been reflected by the magneto-optical disk again passes through the PBS and reaches an optical detector.

The half wavelength plate as referred to herein is one that provides a $\lambda/2$ optical path difference (accordingly, a retardation of $\pi$) between polarizing components having a specific wavelength and intersecting each other.

As such wavelength plates, there have hitherto been used inorganic wavelength plates such as wavelength plates formed of a single crystal provided with birefringence, such as mica, quartz, rock crystal, calcite, $LiNbO_3$, and $LiTaO_3$; wavelength plates having a birefringent film on the surface of a base substrate obtained by obliquely vapor depositing an inorganic material to a base substrate such as a glass substrate; and wavelength plates having an LB (Langmuir-Blodget) film having birefringence.

There have been used wavelength plates prepared by bonding a retardation film obtained by subjecting a transparent resin film such as polycarbonates, polyvinyl alcohol (PVA), polyvinyl butyral (PVB), polyethylene terephthalate (PET), polypropylene (PP), polyallylates, polysulfones, polyethersulfones, and acrylic resins to processing such as stretching onto a glass substrate for the purpose of keeping flatness and shaping or interposing the retardation film between two glass substrates.

Now, recently, DVD is being rapidly spread as a high-density information recording medium. On the other hand, reproduction-only optical disks such as CD, CR-ROM, and CD-R are already widely spread in the market. Therefore, recording and reproducing functions against such a wide variety of optical disks are eagerly demanded. Also, following an enlargement of the application field of devices, realization of miniaturization and low price of optical disk devices is required. Thus, it has been proposed to use a wide-band wavelength plate (retardation plate) for corresponding to plural reading and writing lasers (JP-A-2001-101700 and JP-A-2001-208913).

However, although these wavelength plates are at the practically useful level with respect to the function as a quarter wavelength plate, there is a problem that they are insufficient as a half wavelength plate and are not suitable for practical use.

Under such a circumstance of the foregoing problems of the conventional technologies, the invention has been made and provides a wavelength plate having a function as a quarter wavelength plate and a function as a half wavelength plate against monochromic lights having a different wavelength.

DISCLOSURE OF THE INVENTION

In order to solve the foregoing problems, the present inventors made extensive and intensive investigations. As a result, it has been found that a wavelength plate obtained by laminating a retardation film (A) that provides a retardation of $(1+X)\lambda$ to light having a wavelength $\lambda$ (nm) as defined according to the following expression (1) as an essential component and a retardation film (B) that provides a retardation of $(\frac{1}{4}+Y/2)\lambda$ or a retardation film (C) that provides a retardation of $(\frac{1}{2}+Z)\lambda$ [wherein X, Y, and Z each independently represents 0 or an integer of 1 or more] such that an optical axis of the retardation film (B) or retardation film (C) (fast axis or slow axis) intersects with an optical axis of the retardation film (A) is effective as a quarter wavelength plate or a half wavelength plate against monochromic lights having a different wavelength, leading to accomplishment of the invention.

$$[(\lambda_S+\lambda_L)/2]-200 \leq \lambda \leq [(\lambda_S+\lambda_L)/2]+200 \quad (1)$$

$\lambda_S$: Wavelength (nm) of monochromic light in the shortest wavelength side $\lambda_L$: Wavelength (nm) of monochromic light in the longest wavelength side It has also been found that by using a transparent resin film obtained from a cyclic olefin based resin-containing material as a retardation film, a wavelength plate (retardation plate) having especially excellent heat resistance and stability of a retardation and the like is obtained, leading to accomplishment of the invention.

BEST MODE FOR CARRYING OUT THE INVENTION

The invention will be described in detail below.

In the invention, the retardation film which is used in the wavelength plate is not particularly limited, and the foregoing known materials can be used. However, use of a retardation film obtained by stretching a transparent resin film made of a cyclic olefin based resin-containing material is preferable because the resulting wavelength plate is excellent especially from the standpoints of heat resistance and stability of a retardation.

Examples of the cyclic olefin based resin include the following (co)polymers.

(1) A ring-opening polymer of a specific monomer represented by the following general formula (1).

(2) A ring-opening copolymer of a specific monomer represented by the following general formula (1) and a copolymerizable monomer.

(3) A hydrogenated (co)polymer of the foregoing ring-opening (co)polymer (1) or (2).

(4) A (co)polymer resulting from cyclization of the foregoing ring-opening (co)polymer (1) or (2) by the Friedel-Crafts reaction and then hydrogenation.

(5) A saturated copolymer of a specific monomer represented by the following general formula (1) and an unsaturated double bond-containing compound.

(6) An addition type (co)polymer of at least one monomer selected from a specific monomer represented by the following general formula (1), a vinyl based cyclic hydrocarbon based monomer and a cyclopentadiene based monomer, and a hydrogenated (co)polymer thereof.

General Formula (1)

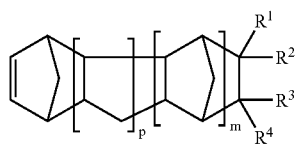

[In the formula, $R^1$ to $R^4$ each represents a hydrogen atom, a halogen atom, a hydrocarbon group having from 1 to 30 carbon atoms, or other monovalent organic group, and may be the same or different. $R^1$ and $R^2$, or $R^3$ and $R^4$ may be taken together to form a divalent hydrocarbon group; and $R^1$ or $R^2$ and $R^3$ or $R^4$ may be bonded to each other to form a monocyclic or polycyclic structure. m represents 0 or a positive integer; and p represents 0 or a positive integer.]

Specific Monomer

Specific examples of the foregoing specific monomer will be given below, but it should not be construed that the invention is limited to these specific examples.

Bicyclo[2.2.1]hept-2-ene
5-Methylbicyclo[2.2.1]hept-2-ene
5-Ethylbicyclo[2.2.1]hept-2-ene
5-Ethylidenebicyclo[2.2.1]hept-2-ene
5-Phenylbicyclo[2.2.1]hept-2-ene
5-Methoxycarbonylbicyclo[2.2.1]hept-2-ene
5-Ethoxycarbonylbicyclo[2.2.1]hept-2-ene
5-Phenoxycarbonylbicyclo[2.2.1]hept-2-ene
5-Methyl-5-methoxycarbonylbicyclo[2.2.1]hept-2-ene
5-Cyanobicyclo[2.2.1]hept-2-ene
5-Fluorobicyclo[2.2.1]hept-2-ene
5-Fluoromethylbicyclo[2.2.1]hept-2-ene
5-Trifluoromethylbicyclo[2.2.1]hept-2-ene
5-Pentafluoroethylbicyclo[2.2.1]hept-2-ene
5,5-Difluorobicyclo[2.2.1]hept-2-ene
5,6-Difluorobicyclo[2.2.1]hept-2-ene
5,5-Bis(trifluoromethyl)bicyclo[2.2.1]hept-2-ene
5,6-Bis(trifluoromethyl)bicyclo[2.2.1]hept-2-ene
5-Methyl-5-trifluoromethylbicyclo[2.2.1]hept-2-ene
5,5,6-Trifluorobicyclo[2.2.1]hept-2-ene
5,5,6-Tris(fluoromethyl)bicyclo[2.2.1]hept-2-ene
5,5,6,6-Tetrafluorobicyclo[2.2.1]hept-2-ene
5,5,6,6-Tetrakis(trifluoromethyl)bicyclo[2.2.1]hept-2-ene
5,5-Difluoro-6,6-bis(trifluoromethyl)bicyclo[2.2.1]hept-2-ene
5,6-Difluoro-5,6-bis(trifluoromethyl)bicyclo[2.2.1]hept-2-ene
5,5,6-Trifluoro-5-trifluoromethylbicyclo[2.2.1]hept-2-ene
5-Fluoro-5-pentafluoroethyl-6,6-bis(trifluoromethyl)bicyclo[2.2.1]hept-2-ene
5,6-Difluoro-5-heptafluoro-isopropyl-6-trifluoromethylbicyclo[2.2.1]hept-2-ene
5-Chloro-5,6,6-trifluorobicyclo[2.2.1]hept-2-ene
5,6-Dichloro-5,6-bis(trifluoromethyl)bicyclo[2.2.1]hept-2-ene
5,5,6-Trifluoro-6-trifluoromethoxybicyclo[2.2.1]hept-2-ene
5,5,6-Trifluoro-6-heptafluoropropoxybicyclo[2.2.1]hept-2-ene
Tricyclo[5.2.1.0$^{2,6}$]-8-decene
Tricyclo[4.4.0.1$^{2,5}$]-3-undecene
Tetracyclo[4.4.0.1$^{2,5}$.1$^{7,10}$]-3-dodecene
8-Methyltetracyclo[4.4.0.1$^{2,5}$.1$^{7,10}$]-3-dodecene
8-Ethyltetracyclo[4.4.0.1$^{2,5}$.1$^{7,10}$]-3-dodecene
8-Ethylidenetetracyclo[4.4.0.1$^{2,5}$.1$^{7,10}$]-3-dodecene
8-Phenyltetracyclo[4.4.0.1$^{2,5}$.1$^{7,10}$]-3-dodecene
8-Methoxycarbonyltetracyclo[4.4.0.1$^{2,5}$.1$^{7,10}$]-3-dodecene
8-Ethoxycarbonyltetracyclo[4.4.0.1$^{2,5}$.1$^{7,10}$]-3-dodecene
8-n-Propoxycarbonyltetracyclo[4.4.0.1$^{2,5}$.1$^{7,10}$]-3-dodecene
8-Isopropoxycarbonyltetracyclo[4.4.0.1$^{2,5}$.1$^{7,10}$]-3-dodecene
8-n-Butoxycarbonyltetracyclo[4.4.0.1$^{2,5}$.1$^{7,10}$]-3-dodecene
8-Phenoxycarbonyltetracyclo[4.4.0.1$^{2,5}$.1$^{7,10}$]-3-dodecene
8-Methyl-8-methoxycarbonyltetracyclo[4.4.0.1$^{2,5}$.1$^{7,10}$]-3-dodecene
8-Methyl-8-ethoxycarbonyltetracyclo[4.4.0.1$^{2,5}$.1$^{7,10}$]-3-dodecene
8-Methyl-8-n-propoxycarbonyltetracyclo[4.4.0.1$^{2,5}$.1$^{7,10}$]-3-dodecene
8-Methyl-8-isopropoxycarbonyltetracyclo[4.4.0.1$^{2,5}$.1$^{7,10}$]-3-dodecene
8-Methyl-8-n-butoxycarbonyltetracyclo[4.4.0.1$^{2,5}$.1$^{7,10}$]-3-dodecene 8-Methyl-8-phenoxycarbonyltetracyclo[$4.4.0.1^{2,5}.1^{7,10}$]-3-dodecene 8-Fluorotetracyclo[$4.4.0.1^{2,5}.1^{7,10}$]-3-dodecene 8-Fluoromethyltetracyclo[$4.4.0.1^{2,5}.1^{7,10}$]-3-dodecene 8-Difluoromethyltetracyclo[$4.4.0.1^{2,5}.1^{7,10}$]-3-dodecene 8-Trifluoromethyltetracyclo[$4.4.0.1^{2,5}.1^{7,10}$]-3-dodecene 8-Pentafluoroethyltetracyclo[$4.4.0.1^{2,5}.1^{7,10}$]-3-dodecene 8,8-Difluorotetracyclo[$4.4.0.1^{2,5}.1^{7,10}$]-3-dodecene 8,9-Difluorotetracyclo[$4.4.0.1^{2,5}.1^{7,10}$]-3-dodecene 8,8-Bis(trifluoromethyl)tetracyclo[$4.4.0.1^{2,5}.1^{7,10}$]-3-dodecene 8,9-Bis(trifluoromethyl)tetracyclo[$4.4.0.1^{2,5}.1^{7,10}$]-3-dodecene 8-Methyl-8-trifluoromethyltetracyclo[$4.4.0.1^{2,5}.1^{7,10}$]-3-dodecene 8,8,9-Trifluorotetracyclo[$4.4.0.1^{2,5}.1^{7,10}$]-3-dodecene 8,8,9-Tris(trifluoromethyl)tetracyclo[$4.4.0.1^{2,5}.1^{7,10}$]-3-dodecene 8,8,9,9-Tetrafluorotetracyclo[$4.4.0.1^{2,5}.1^{7,10}$]-3-dodecene 8,8,9,9-Tetrakis(trifluoromethyl)tetracyclo[$4.4.0.1^{2,5}.1^{7,10}$]-3-dodecene 8,8-Difluoro-9,9-bis(trifluoromethyl)tetracyclo[$4.4.0.1^{2,5}.1^{7,10}$]-3-dodecene 8,9-Difluoro-8,9-bis(trifluoromethyl)tetracyclo[$4.4.0.1^{2,5}.1^{7,10}$]-3-dodecene 8,8,9-Trifluoro-9-trifluoromethyltetracyclo[$4.4.0.1^{2,5}.1^{7,10}$]-3-dodecene 8,8,9-Trifluoro-9-trifluoromethoxytetracyclo[$4.4.0.1^{2,5}.1^{7,10}$]-3-dodecene 8,8,9-Trifluoro-9-pentafluoropropoxytetracyclo[$4.4.0.1^{2,5}.1^{7,10}$]-3-dodecene 8-Fluoro-8-pentafluoroethyl-9,9-bis(trifluoromethyl)tetracyclo[$4.4.0.1^{2,5}.1^{7,10}$]-3-dodecene 8,9-Difluoro-8-heptafluoro-isopropyl-9-trifluoromethyltetracyclo-[$4.4.0.1^{2,5}.1^{7,10}$]-3-dodecene 8-Chloro-8,9,9-trifluorotetracyclo[$4.4.0.1^{2,5}.1^{7,10}$]-3-dodecene 8,9-Dichloro-8,9-bis(trifluoromethyl)tetracyclo[$4.4.0.1^{2,5}.1^{7,10}$]-3-dodecene 8-(2,2,2-Trifluoroethoxycarbonyl)tetracyclo[$4.4.0.1^{2,5}.1^{7,10}$]-3-dodecene 8-Methyl-8-(2,2,2-trifluoroethoxycarbonyl)tetracyclo[$4.4.0.1^{2,5}.1^{7,10}$]-3-dodecene These can be used singly or in combinations of two or more kinds thereof, Of the specific monomers, ones represented by the foregoing general formula(1) wherein $R^1$ and $R^3$ each represents a hydrogen atom or a hydrocarbon group having from 1 to 10 carbon atoms, more preferably a hydrogen atom or a hydrocarbon group having from 1 to 4 carbon atoms, and especially preferably a hydrogen atom or a hydrocarbon group having from 1 to 2 carbon atoms; $R^2$ and $R^4$ each represents a hydrogen atom or a monovalent organic group, and at least one of $R^2$ and $R^4$ represents a polar group having polarity other than a hydrogen atom and a hydrocarbon group; and m represents an integer of from 0 to 3, and p represents an integer of from 0 to 3, more preferably (m+p)=0 to 4, further preferably (m+p)=0 to 2, and especially preferably, m=1 and p=0 are preferable.

Examples of the polar group of the foregoing specific monomer include a halogen, a carboxyl group, a hydroxyl group, an alkoxycarbonyl group, an aryloxycarbonyl group, an amino group, an amide group, a cyano group, an acyl group, a silyl group, an alkoxysilyl group, and an aryloxysilyl group. Of these, a carboxyl group, an alkoxycarbonyl group, and an aryloxycarbonyl group are preferable; and an alkoxycarbonyl group is especially preferable.

These polar groups may be bonded via an alkylene group having from 1 to 10 carbon atoms or a connecting group containing an oxygen atom, a nitrogen atom, or a sulfur atom.

Of the specific monomers, a monomer in which at least one of $R^2$ and $R^4$ is a polar group represented by the formula, —$(CH_2)_n$COOR is preferable because the resulting cyclic olefin based resin has a high glass transition temperature, low hygroscopicity, and excellent adhesion to various materials. In the formation directed to the foregoing specific polar group, R represents a hydrocarbon group having usually from 1 to 12 carbon atoms, preferably from 1 to 4 carbon atoms, and more preferably from 1 to 2 carbon atoms, and especially preferably an alkyl group. n is usually from 0 to 5; and a smaller value of n is preferable because the glass transition temperature of the resulting cyclic olefin based resin is high. Further, the specific monomer wherein n is 0 is preferable because not only its synthesis is easy, but also the glass transition temperature of the resulting cyclic olefin based resin is high.

Further, in the specific monomer, at least one of $R^1$ and $R^2$ in the foregoing general formula (1) is preferably an alkyl group, more preferably an alkyl group having from 1 to 4 carbon atoms, further preferably an alkyl group having 1 to 2 carbon atom, and especially preferably a methyl group. In particular, it is preferable that this alkyl group is bonded to the same carbon atom as a carbon atom to which a specific polar group represented by the foregoing formula, —$(CH_2)_n$COOR is bonded. The specific monomer represented by the general formula (1) wherein p=0 and m=1 is preferable because a cyclic olefin based resin having a high glass transition temperature is obtained.

Of these, 8-methyl-8-methoxycarbonyltetracyclo[$4.4.0.1^{2,5}.1^{7,10}$]-3-dodecene is preferable in view of the heat resistance of the resulting ring-opening polymer and the matter that a change of the retardation before and after sticking when plural sheets are adhered at the time of use as the wavelength plate of the invention and influences due to heat and temperature when used over a long period of time against a retardation value, an aberration and the like are suppressed as far as possible.

Copolymerizable Monomer

Specific examples of the copolymerizable monomer include cycloolefins such as cyclobutene, cyclopentene, cycloheptene, and cyclooctene. The carbon atom number of the cycloolefin is preferably from 4 to 20, and more preferably from 5 to 12. These can be used singly or in combinations of two or more kinds thereof.

Use range of the specific monomer to the copolymerizable monomer is preferably from 100/0 to 50/50, and more preferably from 100/0 to 60/40 in terms of a weight ratio.

Ring-Opening Polymerization Catalyst

In the invention, the ring-opening polymerization reaction for obtaining the ring-opening polymer (1) of a specific monomer and the ring-opening copolymer (2) of a specific monomer and a copolymerizable monomer is carried out in the presence of a metathesis catalyst.

This metathesis catalyst is a catalyst comprising a combination of (a) at least one member selected from W, Mo and Re compounds and (b) at least one member selected from compounds of the IA group elements (for example, Li, Na, and K), the IIA group elements (for example, Mg and Ca), the IIB group elements (for example, Zn, Cd, and Hg), the IIIA group elements (for example, B and Al), the UVA group elements (for example, Si, Sn, and Pb), or the IVB group elements (for example, Ti and Zr) of the Deming's periodic table and containing at least one bond of the element to carbon or bond of the element to hydrogen. In this case, for the purpose of enhancing the activity of the catalyst, the catalyst may be one having (c) an additive as described later added thereto.

Representative examples of the W, Mo or Re compounds which are suitable as the component (a) include compounds described in page 8, left-hand lower half column, line 6 to page 8, right-hand upper half column, line 17 of JP-A-1-132626, such as $WCl_6$, $MoCl_5$, and $ReOCl_3$.

Specific examples of the component (b) include compounds described in page 8, right-hand upper half column, line 18 to page 8, right-hand lower half column, line 3 of JP-A-1-132626, such as n-$C_4H_9Li$, $(C_2H_5)_3Al$, $(C_2H_5)_2AlCl$, $(C_2H_5)_{1.5}AlCl_{1.5}$, $(C_2H_5)AlCl_2$, methylalumoxane, and LiH.

As represents examples of the compound (c) which is an additive, alcohols, aldehydes, ketones, amines, and the like can be suitably used. Further, compounds described in page 8, right-hand lower half column, line 16 to page 9, left-hand upper half column, line 17 of JP-A-1-132626 can be used.

With respect to the amount of the metathesis catalyst to be used, a molar ratio of the foregoing component (a) to the specific monomer is usually in the range of from 1/500 to 1/50,000, and preferably in the range of from 1/1,000 to 1/10,000, in terms of "component (a) to specific monomer".

With respect to the proportion of the component (a) and the component (b), a metal atom ratio of (a) to (b) is in the range of from 1/1 to 1/50, and preferably from 1/2 to 1/30.

With respect to proportion of the component (a) and the component (c), a molar ratio of (c) to (a) is in the range of from 0.005/1 to 15/1, and preferably from 0.05/1 to 7/1.

Solvent for Polymerization Reaction

Examples of a solvent which is used in the ring-opening polymerization reaction (a solvent constituting a molecular weight modifier solution and a solvent of the specific monomer and/or the metathesis catalyst) include alkanes such as pentane, hexane, heptane, octane, nonane, and decane; cycloalkanes such as cyclohexane, cycloheptane, cyclooctane, decalin, and norbornane; aromatic hydrocarbons such as benzene, toluene, xylene, ethylbenzene, and cumene; compounds such as halogenated alkanes and halogenated aryls including chlorobutane, bromohexane, methylene chloride, dichloro-ethane, hexamethylene dibromide, chlorobenzene, chloroform, and tetrachloroethylene; saturated carboxylic acid esters such as ethyl acetate, n-butyl acetate, isobutyl acetate, methyl propionate, and dimethoxyethane; and ethers such as dibutyl ether, tetrahydrofuran, and dimethoxyethane. These can be used singly or in admixture. Of these, aromatic hydrocarbons are preferable.

The amount of the solvent to be used is usually from 1/1 to 10/1, and preferably from 1/1 to 5/1 in terms of "solvent to specific monomer (weight ratio)".

Molecular Weight Modifier

Although it is possible to adjust the molecular weight of the ring-opening (co)polymer to be obtained depending upon the polymerization temperature, the kind of catalyst, and the kind of solvent, the adjustment is achieved by making a molecular weight modifier co-present in the reaction system in the invention.

Examples of the molecular weight modifier that is suitable include styrene as well as α-olefins such as ethylene, propene, 1-butene, 1-pentene, 1-hexene, 1-heptene, 1-octene, 1-nonene, and 1-decene. Of these, 1-butene and 1-hexene are especially preferable.

These molecular weight modifies can be used singly or as mixtures of two or more kinds thereof. The amount of the molecular weight modifier to be used is from 0.005 to 0.6 moles, and preferably from 0.02 to 0.5 moles per mole of the specific monomer to be provided for the ring-opening polymerization reaction.

For the purpose of obtaining the ring-opening copolymer (2), the specific monomer and the copolymerizable monomer may be subjected to ring-opening copolymerization. However, the specific monomer may be further subjected to ring-opening polymerization in the presence of a conjugated diene based polymer such as polybutadiene and polyisoprene, a styrene-butadiene copolymer, an ethylene-non-conjugated diene copolymer, an unsaturated hydrocarbon based polymer containing two or more carbon-carbon double bonds in the major chain such as polynorbornene, or the like.

The thus obtained ring-opening (co)polymer is used as it is. However, the hydrogenated (co)polymer (3) which is obtained by further hydrogenating the ring-opening (co)polymer is useful as a raw material for resins having large impact resistance.

Hydrogenation Catalyst

The hydrogenation reaction is carried out by a usual method. That is, the hydrogenation reaction is carried out by adding a hydrogenation catalyst in a solution of the ring-opening polymer and acting a hydrogen gas of from the atmospheric pressure to 300 atmospheres, and preferably from 3 to 200 atmospheres on the mixture at from 0 to 200° C., and preferably from 20 to 180° C.

As the hydrogenation catalyst, ones which are used for the usual hydrogenation reaction of olefinic compounds can be used. Examples of this hydrogenation catalyst include heterogeneous catalysts and homogeneous catalysts.

Examples of the heterogeneous catalyst include solid catalysts in which a noble metal catalyst substance such as palladium, platinum, nickel, rhodium, and ruthenium is supported on a carrier such as carbon, silica, alumina, and titania. Examples of the homogeneous catalyst include nickel naphthenate/triethylaluminum, nickel acetylacetonate/triethylaluminum, cobalt octenate/n-butyllithium, titanocene dichloride/diethylaluminum monochloride, rhodium acetate, chlorotris-(triphenylphosphine)rhodium, dichlorotris(triphenylphosphine)ruthenium, chlorohydrocarbonyltris(triphenylphosphine)ruthenium, and dichlorocarbonyl-tris(triphenylphosphine)ruthenium. The shape of the catalyst may be powdered or particulate.

Such a hydrogenation catalyst is used in a proportion such that the weight ratio of the ring-opening (co)polymer to the hydrogenation catalyst is from $1/1 \times 10^{-6}$ to 1/2.

In this way, the hydrogenated (co)polymer obtained by hydrogenation has excellent heat stability, and its characteristics are not deteriorated even by heating at the time of molding processing or at the time of use as a product. The hydrogenation degree is usually 50% or more, preferably 70% or more, and more preferably 90% or more.

It is possible to stabilize the thus obtained ring-opening (co)polymer by adding thereto known antioxidants such as 2,6-di-t-butyl-4-methylphenol, 2,2'-dioxy-3,3'-di-t-butyl-5,5'-dimethyldiphenylmethane, and tetrakis[methylene-3-(3,5-di-t-butyl-4-hydroxyphenyl)propionato]methane; ultraviolet absorbers such as 2,4-dihydroxy-benzophenone and 2-hydroxy-4-methoxybenzophenone; and the like. For the purpose of improving the processability, additives such as lubricants can be added.

The hydrogenation degree of the hydrogenated (co)polymer is 50% or more, preferably 90% or more, more preferably 98% or more, and most preferably 99% or more in terms of a value as measured by $^1$H-NMR at 500 MHz. The higher the hydrogenation degree, the more excellent the stability against heat or light is. Thus, when used as the wavelength plate of the invention, stable characteristics can be obtained over a long period of time.

The hydrogenated (co)polymer which is used as the cyclic olefin based resin of the invention preferably has a gel content in the hydrogenated (co)polymer of 5% by weight or less, and especially preferably 1% by weight or less. When the gel content exceeds 5% by weight, there is some possibility that flatness of the film obtainable from the resin becomes problematic, or that during stretching to form a retardation film, optical deficiencies such as the generation of unevenness of a retardation or luminescent spot are caused.

As the cyclic olefin based resin of the invention, the (co)polymer (4) resulting from cyclization of the foregoing ring-opening (co)polymer (1) or (2) by the Friedel-Crafts reaction and then hydrogenation can be used.

Cyclization by Friedel-Crafts Reaction

Although the method for cyclizing the ring-opening (co)polymer (1) or (2) by the Friedel-Crafts reaction is not particularly limited, a known method using an acidic compound as described in JP-A-50-154399 can be employed. Specific examples of the acidic compound which is used include Lewis acids and Bronsted acids such as $AlCl_3$, $BF_3$, $FeCl_3$, $Al_2O_3$, HCl, and $CH_3ClCOOH$.

The cyclized ring-opening (co)polymer can be subjected to hydrogenation in the same manner as in the ring-opening (co)polymer (1) or (2).

Further, as the cyclic olefin based resin of the invention, the saturated copolymer (5) of a specific monomer represented by the following general formula (1) and an unsaturated double bond-containing compound can be used.

Unsaturated Double Bond-Containing Compound

Examples of the unsaturated double bond-containing compound include olefin based compounds preferably having from 2 to 12 carbon atoms, and more preferably from 2 to 8 carbon atoms, such as ethylene, propylene, and butene.

A range of the specific monomer to the unsaturated double bond-containing compound to be used is preferably from 90/10 to 40/60, and more preferably from 85/15 to 50/50 in terms of a weight ratio.

In the invention, in order to obtain the saturated copolymer (5) of a specific monomer and an unsaturated double bond-containing compound, a usual addition polymerization method can be employed.

Addition Polymerization Catalyst

As a catalyst for synthesizing the foregoing saturated copolymer (5), at least one member selected from titanium compounds, zirconium compounds, and vanadium compounds and an organoaluminum compound as a co-catalyst are used.

Examples of the titanium compound include titanium tetrachloride and titanium trichloride; and examples of the zirconium compound include bis(cyclopentadienyl)zirconium chloride and bis(cyclopentadienyl)zirconium dichloride.

Examples of the vanadium compound include vanadium compounds represented by the following general formulae and electron donative addition materials thereof.

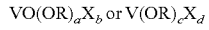

[Here, R represents a hydrocarbon group; X represents a halogen atom; and $0 \leq a \leq 3$, $0 \leq b \leq 3$, $2 \leq (a+b) \leq 3$, $0 \leq c \leq 4$, $0 \leq d \leq 4$, and $3 \leq (c+d) \leq 4$.]

Examples of the foregoing electron donor include oxygen-containing electron donors such as alcohols, phenols, ketones, aldehydes, carboxylic acids, esters of organic acids or inorganic acids, ethers, acid amides, acid anhydrides, and alkoxysilanes; and nitrogen-containing electron donors such as ammonia, amines, nitriles, and isocyanates.

Further, as the organoaluminum compound as a co-catalyst, at least one member selected from compounds containing at least one aluminum-carbon bond or compounds containing at least one aluminum-hydrogen bond is used.

In the above, for example, in the case of using a vanadium compound, with respect to the ratio of the vanadium compound and the aluminum compound, a ratio of the aluminum atom to the vanadium atom (Al/V) is in the range of 2 or more, preferably from 2 to 50, and especially preferably from 3 to 20.

As a solvent for polymerization reaction which is used for the addition polymerization, the same solvent as used in the ring-opening polymerization reaction can be used. Adjustment of the molecular weight of the resulting saturated copolymer (5) is usually carried out using hydrogen.

Further, as the cyclic olefin based resin of the invention, the addition type (co)polymer (6) of at least one monomer selected from a specific monomer, a vinyl based cyclic hydrocarbon based monomer and a cyclopentadiene based monomer, and a hydrogenated (co)polymer thereof can be used.

Vinyl Based Cyclic Hydrocarbon Based Monomer

Examples of the vinyl based cyclic hydrocarbon based monomer include vinylated 5-membered hydrocarbon based monomers including vinylcyclopentene based monomers such as 4-vinylcyclopentene and 2-methyl-4-isopropenylcyclopentene, and vinylcyclopentane based monomers such as 4-vinylcyclopentane and 4-isopropenylcyclopentane; vinylcyclohexene based monomers such as 4-vinylcyclohexene, 4-isopropenylcyclohexene, 1-methyl-4-isopropenylcyclohexene, 2-methyl-4-vinylcyclohexene, and 2-methyl-4-isopropenylcyclohexene; vinylcyclohexane based monomers such as 4-vinylcyclohexane and 2-methyl-4-isopropenylcyclohexane; styrene based monomers such as styrene, α-methylstyrene, 2-methylstyrene, 3-methylstyrene, 4-methylstyrene, 1-vinyl-naphthalene, 2-vinylnaphthalene, 4-phenylstyrene, and p-methoxystyrene; terpene based monomers such as d-terpene, 1-terpene, diterpene, d-limonene, 1-limonene, and dipentene; vinylcycloheptene based monomers such as 4-vinylcycloheptene and 4-isopropenylcycloheptene; and vinylcycloheptane based monomers such as 4-vinylcycloheptane and 4-isopropenylcycloheptane. Of these, styrene and α-methylstyrene are preferable. These can be used singly or in combinations of two or more kinds thereof.

Cyclopentadiene Based Monomer

Examples of the cyclopentadiene based monomer which is used as the monomer of the addition type (co)polymer (6) of the invention include cyclopentadiene, 1-methylcyclopentadiene, 2-methylcyclopentadiene, 2-ethylcyclopentadiene, 5-methyl-cyclopentadiene, 5,5-methylcyclopentadiene, and dicyclopentadiene. Of these, cyclopentadiene and dicyclopentadiene are preferable. These can be used singly or in combinations of two or more kinds thereof.

The foregoing addition type (co)polymer of at least one monomer selected from a specific monomer, a vinyl based cyclic hydrocarbon based monomer and a cyclopentadiene based monomer can be obtained in the same addition polymerization method as in the foregoing saturated copolymer (5) of a specific monomer and an unsaturated double bond-containing compound.

The hydrogenated (co)polymer of the foregoing addition type (co)polymer can be obtained in the same hydrogenation method as in the foregoing hydrogenated (co)polymer of the ring-opening (co)polymer (3).

The cyclic olefin based resin which is used in the invention has a molecular weight of preferably from 0.2 to 5 dl/g, more preferably from 0.3 to 3 dl/g, and especially preferably from 0.4 to 1.5 dl/g, in terms of an inherent viscosity $[\eta]_{inh}$; and has a number average molecular weight (Mn) of preferably from 8,000 to 300,000, more preferably of from 10,000 to 100,000, and especially preferably from 12,000 to 80,000 and a weight average molecular weight (Mw) of preferably from 20,000 to 500,000, more preferably from 30,000 to 350,000, and especially preferably from 40,000 to 250,000, as reduced into polystyrene measured by the gel permeation chromatography (GPC).

By making the inherent viscosity $[\eta]_{inh}$ or weight average molecular weight fall within the foregoing range, a balance between the molding processability, heat resistance, water resistance, chemical resistance and mechanical characteristics and the stability of a retardation when used as the wavelength plate of the invention becomes well.

Saturated water absorption of the thus obtained ring-opening polymer or hydrogenated material is preferably in the range of from 0.05 to 2% by weight, and more preferably from 0.1 to 1% by weight at 23° C. When the saturated water absorption falls within this range, the retardation is uniform; the adhesion of the resulting cyclic olefin based resin film to the glass substrate or the like is excellent so that peeling is not generated in the way of use; and the compatibility with an antioxidant, etc., is excellent so that it can be added in a large amount. Incidentally, the foregoing saturated water absorption is a value obtained by measuring an increased weight after dipping in water at 23° C. for one week according to ASTM D570.

When the saturated water absorption is less than 0.05% by weight, the adhesion to the glass substrate or the transparent support or the like becomes poor, and peeling is likely generated. On the other hand, when it exceeds 2% by weight, the cyclic olefin based resin film is liable to cause a dimensional change due to the absorption of water.

In the invention, a cyclic olefin based resin having a photoelastic coefficient $(C_P)$ of from 0 to 100 $(\times 10^{-12}\,\text{Pa}^{-1})$ and a stress-optical coefficient $(C_R)$ of from 1,500 to 4,000 $(\times 10^{-12}\,\text{Pa}^{-1})$ is suitably used.

The photoelastic coefficient $(C_P)$ and stress-optical coefficient $(C_R)$ are described in various documents (*Polymer Journal*, Vol. 27, No. 9, pp. 943-950 (1995); *Nihon Reoroji Gakkaishi* (Journal of the Society of Rheology, Japan), Vo. 19, No. 2, pp. 93-97 (1991); and *Hikaridansei Jikkenho* (Photoelasticity Experimental Methods), The Nikkankogyo Shimbun, Ltd., 1975, 7th Ed.). The former expresses a degree of generation of a retardation due to the stress in the glass state of the polymer, and the latter expresses a degree of generation of a retardation due to the stress in the fluidized state.

What the photoelastic coefficient $(C_P)$ is large means that in the case where the polymer is used in the glass state, a retardation is likely generated sensitively due to an external factor or a stress generated from a strain when it is frozen itself. For example, it is meant that an unnecessary change of retardation is likely generated due to a residual strain at the time of sticking in laminating, or a fine stress generated by shrinkage of the material caused by a temperature change or a humidity change as in the invention. From this matter, it is preferable that the photoelastic coefficient $(C_P)$ is as small as possible.

On the other hand, what the stress-optical coefficient $(C_R)$ is large brings such advantages that a desired retardation is obtained at a low stretching ratio during imparting revealing properties of retardation to the cyclic olefin based resin film; that a retardation film capable of imparting a large retardation is likely obtained; and that in the case where the same retardation is desired, the film can be made thin as compared with those having a small stress-optical coefficient $(C_R)$.

From the foregoing standpoints, the photoelastic coefficient $(C_P)$ is preferably from 0 to 100 $(\times 10^{-12}\,\text{Pa}^{-1})$, more preferably from 0 to 80 $(\times 10^{-12}\,\text{Pa}^{-1})$, further preferably from 0 to 50 $(\times 10^{-12}\,\text{Pa}^{-1})$, especially preferably from 0 to 30 $(\times 10^{-12}\,\text{Pa}^{-1})$, and most preferably from 0 to 20 $(\times 10^{-12}\,\text{Pa}^{-1})$. The case where the photoelastic coefficient exceeds 100 $(\times 10^{-12}\,\text{Pa}^{-1})$ is not preferable because in the laminated wavelength plate to be used in the invention, a deviation from the tolerable error range of an optimum sticking optical axis angle is generated due to a stress as generated at the time of adhering or a change of retardation as generated by the environmental change during the use, or the like, resulting in lowering of the quantity of transmitted light when used as the wavelength plate.

The stress-optical coefficient $(C_R)$ is preferably from 1,500 to 4,000 $(\times 10^{-12}\,\text{Pa}^{-1})$, more preferably from 1,700 to 4,000 $(\times 10^{-12}\,\text{Pa}^{-1})$, and especially preferably from 2,000 to 4,000 $(\times 10^{-12}\,\text{Pa}^{-1})$. When the stress-optical coefficient $(C_R)$ is less than 1,500 $(\times 10^{-12}\,\text{Pa}^{-1})$, unevenness of a retardation is likely generated at the time of stretching during revealing a desired retardation. On the other hand, when it exceeds 4,000 $(\times 10^{-12}\,\text{Pa}^{-1})$, there is some possibility that a problem occurs such that it becomes difficult to control the stretching ratio at the time of stretching.

When the cyclic olefin based resin to be used in the invention is formed into a 25 μm-thick film under conditions at 40° C. and 90% RH, its water vapor permeability is preferably from 1 to 400 g/m²·24 hr, more preferably from 5 to 350 g/m²·24 hr, and especially preferably from 10 to 300 g/m²·24 hr.

What the water vapor permeability is made to fall within this range is preferable because it is possible to reduce or avoid a change of the characteristics due to the water content of a pressure-sensitive adhesive or an adhesive to be used for sticking the retardation film to the transparent support, or the humidity of the environment where the wavelength plate is used.

As described previously, although the cyclic olefin based resin which is used in the invention is constructed of the ring-opening (co)copolymer (1) or (2), the hydrogenated (co) polymer (3) or (4), the saturated copolymer (5), or the addition type (co)polymer (6), it can be more stabilized by adding known antioxidants and ultraviolet absorbers and the like thereto. Also, for the sake of improving the processability, additives which are used in the conventional resin processing, such as lubricants, can be added.

A glass transition temperature (Tg) of the cyclic olefin based resin which is used in the invention is preferably from 110 to 350° C., more preferably from 115 to 250° C., and especially preferably from 120 to 200° C. What the Tg is lower than 110° C. is not preferable because when formed as a wavelength plate, a change of the characteristics becomes large due to heat from a laser beam source or its adjacent parts. On the other hand, what the Tg exceeds 350° C. is not preferable because in the case of processing by heating in the vicinity of Tg by stretching processing or the like, the possibility that the resin causes thermal degradation becomes high.

The cyclic olefin based resin film which is used for the wavelength plate of the invention can be obtained by forming the foregoing cyclic olefin based resin into a film or sheet by the melt molding method or solution casting method (solvent casting method) or the like. Above all, the solvent casting method is preferable from the standpoints of uniform film thickness and good surface smoothness.

A method for obtaining the cyclic olefin based resin film by the solvent casting method is not particularly limited, and known methods may be employed. For example, there is enumerated a method in which the cyclic olefin based resin of the invention is dissolved or dispersed in a solvent to form a solution having an appropriate concentration, the solution is poured or coated on a suitable carrier, and after drying, the film is peeled apart from the carrier.

Various conditions for the method for obtaining the cyclic olefin based resin film by the solvent casting method will be given below, but it should not be construed that the invention is limited to these various conditions.

In dissolving or dispersing the cyclic olefin based resin in a solvent, the concentration of the resin is preferably from 0.1 to 90% by weight, more preferably from 1 to 50% by weight, and especially preferably from 10 to 35% by weight. When the concentration of the resin is less than the foregoing range, there is some possibility that problems occur such that it becomes difficult to secure the thickness of the film and that it becomes difficult to obtain surface smoothness of the film by expansion caused due to evaporation of the solvent, or the like. On the other hand, what it exceeds the foregoing range is not preferable because the solution viscosity becomes too high, thereby possibly causing a problem in uniformity of the thickness or surface smoothness of the resulting cyclic olefin based resin film.

The viscosity of the foregoing solution at room temperature is usually from 1 to 1,000,000 mPa·s, preferably from 10 to 100,000 mPa·s, more preferably from 100 to 50,000 mPa·s, and especially preferably from 1,000 to 40,000 mPa·s.

Examples of the solvent to be used include aromatic solvents such as benzene, toluene, and xylene; cellosolve based solvents such as methyl cellosolve, ethyl cellosolve, and 1-methoxy-2-propanol; ketone based solvents such as diacetone alcohol, acetone, cyclohexanone, methyl ethyl ketone, and 4-methyl-2-pentanone; ester based solvents such as methyl lactate and ethyl lactate; cycloolefin based solvents such as cyclohexanone, ethylcyclohexanone, and 1,2-dimethylcyclohexanone; halogen-containing solvents such as 2,2,3,3-tetrafluoro-1-propanol, methylene chloride, and chloroform; ether based solvents such as tetrahydrofuran and dioxane; and alcohol based solvents such as 1-pentanol and 1-butanol.

Besides the foregoing, by using a solvent having an SP value (solubility parameter) in the range of usually from 10 to 30 $(MPa^{1/2})$, preferably from 10 to 25 $(MPa^{1/2})$, more preferably from 15 to 25 $(MPa^{1/2})$, and especially preferably from 15 to 20 $(MPa^{1/2})$, it is possible to obtain a cyclic olefin based resin film having good surface uniformity and optical characteristics.

The foregoing solvents can be used singly or as mixtures of plural kinds thereof.

In that case, it is preferable that in the mixed system, the range of the SP value falls within the foregoing range. At this time, the SP value of the mixed system can be expected by a weight ratio. For example, in the mixture of two kinds, when the weight fraction is defined as W1 and W2, respectively, and the SP value is defined as SP1 and SP2, respectively, the SP value of the mixed system can be determined as a value as calculated according to the following expression.

$$(SP\ \text{value}) = W1 \cdot SP1 + W2 \cdot SP2$$

As a method for producing the cyclic olefin based resin film by the solvent casting method, there is generally enumerated a method in which the foregoing solution is coated on a substrate such as a metal drum, a steel belt, a polyester film such as polyethylene terephthalate (PET) and polyethylene naphthalate (PEN), and a polytetrafluoroethylene (a trade name: TEFLON) belt by using a die or a coater, the solvent is subsequently dried, and the film is then peeled apart from the substrate.

The cyclic olefin based resin film can be produced by coating the solution on a substrate by spraying, brushing, roll spin coating, dipping, etc., subsequently drying the solvent, and then peeling apart the film from the substrate. The thickness or surface smoothness or the like may be controlled by repeated coating.

The drying step of the foregoing solvent casting method is not particularly limited and can be carried out by a generally employed method, for example, a method for passing in a drying furnace via the plural number of rolls. However, in the drying step, when following evaporation of the solvent, air bubbles are generated, the characteristics of the film are remarkably lowered. Accordingly, for the purpose of avoiding this matter, it is preferable that the drying step is divided into plural steps of two stages or more, thereby controlling the temperature or air flow in each step.

The amount of the residual solvent in the cyclic olefin based resin film is preferably 10% by weight or less, more preferably 5% by weight or less, especially preferably 1% by weight or less, and most preferably 0.5% by weight or less. What the amount of the residual solvent exceeds 10% by weight is not preferable because in the actual use, a dimensional change with time may possibly become large. Such is not preferable because the Tg becomes low due to the residual solvent, whereby the heat resistance may be possibly lowered.

For the purpose of suitably performing a stretching step as described later, there may be the case where the foregoing amount of the residual solvent must be properly adjusted within the foregoing range. Specifically, in order to reveal the retardation at the time of stretching and orientation uniformly and stably, there may be the case where the amount of the residual solvent is adjusted preferably at from 10 to 0.1% by weight, more preferably from 5 to 0.1% by weight, and especially preferably from 1 to 0.1% by weight.

By making a trace amount of the solvent remain, there may be the case where the stretching processing becomes easy, or it becomes easy to control the retardation.

Thickness of the cyclic olefin based resin film of the invention is usually from 0.1 to 500 µm, preferably from 0.1 to 300 µm, and more preferably from 1 to 250 µm. When the thickness is less than 0.1 µm, handling becomes substantially difficult. On the other hand, what it exceeds 500 µm is not preferable because not only it is difficult to wind up the film in the rolled shape, but also the transmittance may be possibly lowered as the wavelength plate of the invention which is aimed at high transmittance of laser beams.

Thickness distribution of the cyclic olefin based resin film of the invention is preferably within ±20%, more preferably ±10%, especially preferably ±5%, and most preferably ±3% against the mean value. Also, it is desirable that a fluctuation of the thickness per 1 cm is preferably 10% or less, more preferably 5% or less, especially preferably 1% or less, and most preferably 0.5% or less. What such a thickness control is performed is preferable because not only it is possible to prevent an unevenness of the retardation in stretching and orientation, but also the aberration characteristics become well when formed into a wavelength plate.

For the retardation film to be used for the wavelength plate of the invention, one prepared by subjecting the cyclic olefin based resin film obtained by the foregoing method to stretching processing is suitably used. Specifically, such a retardation film can be produced by a known uniaxial stretching method or biaxial stretching method. That is, a horizontal uniaxial stretching method by the tenter method, an inter-roll compression stretching method, a vertical uniaxial stretching method utilizing rolls having a different peripheral speed, a biaxial stretching method composed of a combination of horizontal uniaxial stretching and vertical uniaxial stretching, a stretching method by the inflation method, and the like can be employed.

In the case of the uniaxial stretching method, the stretching rate is usually from 1 to 5,000%/min, preferably from 50 to 1,000%/min, further preferably from 100 to 1,000%/min, and especially preferably from 100 to 500%/min.

The case of the biaxial stretching method includes the case where the stretching is carried out at the same time in the two directions and the case where after uniaxial stretching, a stretching treatment is carried out in the direction different from the first stretching direction. In these cases, an intersecting angle of the two stretching axes is usually in the range of from 120 to 60 degrees. The stretching rate may be identical or different in the respective stretching directions; and it is usually from 1 to 5,000%/min, preferably from 50 to 1,000%/min, more preferably from 100 to 1,000%/min, and especially preferably from 100 to 500%/min.

Although the stretching processing temperature is not particularly limited, it is preferably in the range of (Tg±30° C.), more preferably (Tg±10° C.), and especially preferably from (Tg−5° C.) to (Tg+10° C.) on the basis of the glass transition temperature (Tg) of the cyclic olefin based resin of the invention. By making the stretching processing temperature fall within the foregoing range, not only it becomes possible to suppress the generation of an unevenness of the retardation, but also it becomes easy to control an index ellipsoid, and therefore, such is preferable.

The stretch ratio is determined by the desired characteristics and therefore, is not particularly limited. However, it is preferably from 1.01 to 10 times, more preferably from 1.1 to 5 times, and especially preferably from 1.1 to 3 times. When the stretch ratio exceeds 10 times, there is some possibility that control of the retardation becomes difficult.

Although the stretched film may be cooled as it is, it is preferable that the stretched film is allowed to stand in the temperature atmosphere at from (Tg−20° C.) to Tg for preferably at least 10 seconds, more preferably from 30 seconds to 60 minutes, and especially preferably from one minute to 60 minutes. In this way, a retardation film which is little in a change of retardation characteristics with time and stable is obtained.

A linear expansion coefficient of the cyclic olefin based resin film of the invention is preferably $1 \times 10^{-4}$ (1/° C.) or less, more preferably $9 \times 10^{-5}$ (1/° C.) or less, especially preferably $8 \times 10^{-5}$ (1/° C.) or less, and most preferably $7 \times 10^{-5}$ (1/° C.) or less, at a temperature in the range of from 20° C. to 100° C. In the case where the cyclic olefin based resin film is stretched, a difference of the linear expansion coefficient between the stretching direction and the vertical direction thereto is preferably $5 \times 10^{-5}$ (1/° C.) or less, more preferably $3 \times 10^{-5}$ (1/° C.) or less, and especially preferably $1 \times 10^{-5}$ (1/° C.) or less. By making the linear expansion coefficient fall within the foregoing range, when the retardation film made of a cyclic olefin based resin film of the invention is laminated to form the wavelength plate of the invention, a change of the retardation which is brought by a change of the stress caused due to influences such as temperature and humidity at the time of use is suppressed, whereby stability of the characteristics over a long period of time can be obtained when used as the wavelength plate of the invention.

In the thus stretched film, the molecule is oriented by stretching, thereby giving a retardation to the transmitted light. This retardation can be controlled by a retardation value of the film before stretching, stretch ratio, stretching temperature, and thickness of the film after stretching and orientation. The retardation is defined by the product (Δnd) of a refractive index difference of birefringent light (Δn) and a thickness (d).

In the case where the film before stretching has a constant thickness, when the stretch ratio of the film is large, an absolute value of the retardation tends to become large. Accordingly, by changing the stretch ratio, it is possible to obtain a retardation film having a desired retardation value.

The retardation films (A), (B) and (C) which are used in the invention give a specific retardation to light having a wavelength λ (nm) defined according to the following expression (1).

$$[(\lambda_S+\lambda_L)/2]-200 \leq \lambda \leq [(\lambda_S+\lambda_L)/2]+200 \qquad (1)$$

$\lambda_S$: Wavelength (nm) of monochromic light in the shortest wavelength side $\lambda_L$: Wavelength (nm) of monochromic light in the longest wavelength side Although in the expression (1), λ is defined as a width of ±200 nm against $[(\lambda_S+\lambda_L)/2]$, the width is preferably ±100 nm, more preferably ±50 nm, and especially preferably ±20 nm. When λ falls outside this range of the width, there is some possibility that the same polarizing characteristics against monochromic lights having a different wavelength, that is, a function as a quarter wavelength plate or a function as a half wavelength plate do not reveal sufficiently.

The retardation film (A) which is used in the invention is a retardation film that provides a retardation of (1+X)λ to light having a wavelength λ as defined according to the foregoing expression (1) [here, X represents 0 or an integer of 1 or more].

In the retardation film (A), the value of X is usually from 0 to 10, preferably from 0 to 5, more preferably from 0 to 2, and most preferably 0. When the value of X exceeds 10, there is some possibility that not only a retardant film is hardly obtained, but also a scatter of the retardation becomes problematic. In obtaining the retardation film (A), plural retardation films may be laminated while keeping optical axes, for example, slow axes, of the respective retardation films in parallel.

The retardation film (B) which is used in the invention is a retardation film that provides a retardation of (¼+Y/2)λ to light having a wavelength λ as defined according to the foregoing expression (1) [here, Y represents 0 or an integer of 1 or more].

In the retardation film (B), the value of Y is usually from 0 to 10, preferably from 0 to 5, more preferably from 0 to 2, and most preferably 1. When the value of Y exceeds 10, there is some possibility that not only a retardant film is hardly obtained, but also a scatter of the retardation becomes problematic. In obtaining the retardation film (B), plural retardation films may be laminated while keeping optical axes, for example, slow axes, of the respective retardation films in parallel.

The retardation film (C) which is used in the invention is a retardation film that provides a retardation of (½+Z)λ to light having a wavelength λ as defined according to the foregoing expression (1) [here, Z represents 0 or an integer of 1 or more].

In the retardation film (C), the value of Z is usually from 0 to 10, preferably from 0 to 5, more preferably from 0 to 2, and most preferably 0 or 1. When the value of Z exceeds 10, there is some possibility that not only a retardant film is hardly obtained, but also a scatter of the retardation becomes problematic. In obtaining the retardation film (C), plural retardation films may be laminated while keeping optical axes, for example, slow axes, of the respective retardation films in parallel.

In the invention, a difference between the retardation value of the retardation film (A) and the retardation value of the retardation film (B) or retardation film (C) as measured by the light having a wavelength $\lambda$ as defined according to the foregoing expression (1) is preferably 1,000 nm or less, more preferably 500 nm or less, and especially preferably 200 nm or less. By setting up the retardation value of the retardation film (B) or (C) such that it falls within the range, not only a tolerable width of scatter at a sticking angle as described later becomes large and the productivity is improved, but also the characteristics as a wavelength plate become stable, and therefore, such is preferable.

It is necessary that the retardation films (A), (B) and (C) which are used in the invention be little in wavelength dependency of the retardation. That is, it is necessary that a ratio (Re800/Re550) of a retardation (Re800) in light having a wavelength of 800 nm to a retardation (Re550) in light having a wavelength of 550 nm is usually from 0.90 to 1.05, and preferably from 0.95 to 1.00. When the wavelength dependency of the retardation falls outside the foregoing range, there is some possibility that the same polarizing characteristics against monochromic lights having a different wavelength, that is, a function as a quarter wavelength plate or a function as a half wavelength plate does not reveal sufficiently.

In the invention, in laminating the retardation film (A) and the retardation film (B) or retardation film (C), the intersecting angle of the optical axes is properly adjusted depending upon the retardation values of the respective retardation films to be used, the difference between the retardation values, and the wavelength dependency of the retardation.

For example, in the case of obtaining a wavelength plate having a function as a quarter wavelength plate against two monochromic lights having a different wavelength by using the retardation film (A) of $\lambda$ (X=0) and the retardation film (B) of $3\lambda/4$ (Y=1), an intersecting angle between the optical axis of the retardation film (A) and the optical axis of the retardation film (B) is preferably from 40 to 80 degrees or from 90 to 130 degrees, and more preferably from 50 to 70 degrees or from 100 to 120 degrees. Also, in the case where an intersecting angle between the optical axis of the retardation film (A) and the optical axis of the retardation film (B) is in the range of from 40 to 80 degrees, an angle (polarizing azimuth angle) between the polarizing direction of linearly polarized light to be made incident into the retardation film (A) and the slow axis of the retardation film (A) is preferably from 0 to 50 degrees or from 100 to 150 degrees, and more preferably from 10 to 40 degrees or from 110 to 140 degrees. Also, in the case where the foregoing intersecting angle is from 90 to 130 degrees, the polarizing azimuth angle is preferably from 40 to 80 degrees or from 130 to 170 degrees, and more preferably from 50 to 70 degrees or from 140 to 160 degrees.

In the case of obtaining a wavelength plate having a function as a half wavelength plate against two monochromic lights having a different wavelength by using the retardation film (A) of $\lambda$ (X=0) and the retardation film (C) of $\lambda/2$ (Z=0), an intersecting angle between the optical axis of the retardation film (A) and the optical axis of the retardation film (C) is preferably from 20 to 70 degrees, more preferably from 40 to 60 degrees, and especially preferably from 50 to 60 degrees; and a polarizing azimuth angle is preferably from 0 to 45 degrees, more preferably from 5 to 30 degrees, and especially preferably from 10 to 20 degrees.

As a laminating method of the resin film in the invention, methods utilizing known (pressure-sensitive type) adhesive or pressure-sensitive adhesive, UV-curable adhesive, and the like are enumerated. Examples thereof include:

1) A method in which one sheet of a retardation film is bonded and fixed to one surface of a transparent support such as glasses and transparent plastics, and the support is laminated such that the optical axis of the retardation film has a desired angle.

2) A method in which one sheet of a retardation film is bonded and fixed to each of the both surfaces of the foregoing transparent support such that the optical axis has a desired angle.

3) A combination of the foregoing methods.

Of these, a method for bonding and fixing one sheet of retardation film on each of the both surfaces of the transparent support is preferable because the thickness of the resulting wavelength plate can be reduced.

In the invention, a transparent substrate such as glasses may be laminated on a retardation film bonded and fixed to a transparent support. An antireflection treatment may be applied to the retardation film or the transparent substrate laminated thereon.

In the invention, although a support made of an organic material and/or an inorganic material can be used as the transparent support, the case where the support is made of an inorganic material is preferable; and a glass is especially preferable from the standpoints of optical characteristics such as transparency and long-term stability as a wavelength plate. On the other hand, in the case where an organic material is used, one having a continuously usable temperature (a temperature at which neither deformation nor coloration occurs even upon exposure for 1,000 hours or more) of usually 100° C. or higher, preferably 120° C. or higher, and more preferably 150° C. or higher and a water vapor permeability of preferably 20 g/m²·24 hr or less, more preferably 10 g/m²·24 hr or less, and especially preferably 5 g/m²·24 hr or less, under conditions at 40° C. and 90% RH is suitably used. In the case where the continuously usable temperature or the water vapor permeability falls outside the foregoing range, when used as a wavelength plate over a long period of time, there is some possibility that initial characteristics change due to coloration or deformation, resulting in a problem. Therefore, such is not preferable. Also, in the case of an organic material is used, for the purpose of more preventing the deformation due to heat or stress, the thickness is preferably from 0.5 to 5 mm, more preferably from 0.5 to 1 mm, and especially preferably from 0.7 to 1 mm. When the thickness is smaller than this range, there is some possibility that the water vapor permeability becomes too high, or that deformation readily occurs. On the other hand, when the thickness is too large, not only the film is hardly processed, but also the light transmittance is lowered. Therefore, such is not preferable. The organic material does not substantially have retardation. What the organic material has retardation is not preferable because influences are given to the transmitted light.

Examples of such an organic material include thermosetting epoxy resins, polyallylates, special acrylic resins, polysulfones, polycarbonates, polyethersulfones, and cyclic olefin based resins.

The foregoing transparent support may be one obtained by combining transparent materials which are the same or different, for example, one in which an inorganic oxide layer or an organic material layer is provided on the glass surface by a method such as vapor deposition, sputtering, and coating.

Difference between the refractive index of the transparent support and the refractive index of the adhesive layer is preferably within 0.20, more preferably within 0.15, especially preferably within 0.10, and most preferably within 0.05. Difference in the refractive index between the transparent support and the resin film of the invention is preferably within 0.20, more preferably within 0.15, especially preferably within 0.10, and most preferably within 0.05. By making the difference in the refractive index fall within this range, it is possible to control a loss due to reflection of the transmitted light at the minimum level, and therefore, such is preferable.

In the invention, the shape of the transparent support is not particularly limited and may be tabular or may be one having an optical function such as a lattice shape and a prism shape. The thickness is usually from 0.01 to 5 mm, preferably from 0.05 to 3 mm, and more preferably from 0.05 to 1 mm. When the thickness is less than 0.01 mm, not only the stiffness is insufficient, but also the handling properties are deteriorated. On the other hand, when it exceeds 5 mm, the size as a wavelength plate becomes large so that it is difficult to miniaturize an optical device.

In the invention, as the pressure-sensitive adhesive or adhesive for bonding and fixing the retardation film onto the transparent support, known materials can be used so far as they are useful for optical use. Specific examples thereof include natural rubber based, synthetic rubber based, vinyl acetate/vinyl chloride copolymer based, polyvinyl ether based, acrylic or modified polyolefin based pressure-sensitive adhesives; curable adhesives resulting from adding a curing agent such as isocyanates to the foregoing pressure-sensitive adhesive; dry laminating adhesives comprising a mixture of a polyurethane based resin solution and a polyisocyanate based resin solution; synthetic rubber based adhesives; epoxy based adhesives; and acrylic adhesives. Also, when classified in terms of the form, the adhesive or pressure-sensitive adhesive may be of any form of a solvent type, an aqueous dispersion type, or a solvent-free type; and when classified in terms of the curing method, there are enumerated known pressure-sensitive adhesives or adhesives such as a two-pack mixture thermosetting type, a one-pack thermosetting type, a solvent drying type, and a radiation curable type by ultraviolet light, etc. Of these, acrylic ultraviolet light-curable type adhesives are preferable; and solvent-free types are especially preferable because an unevenness of the retardation is hardly generated.

In the invention, as a method for forming an antireflection film on one surface or both surfaces of the retardation film or transparent support, for example, there is enumerated a known method in which a transparent film of a metal oxide is provided by vapor deposition or sputtering. As the thus provided antireflection layer, a multilayered film of such a metal oxide is preferable because a low reflectance is obtained over a wide wavelength region.

There is enumerated a method in which a transparent organic material having a reflectance lower than that of the resin film or transparent substrate, such as fluorine based copolymers, is dissolved in an organic solvent, and the solution is coated on the resin film or transparent substrate using a bar coater, a spin coater, or a gravure coater, heated and dried (cured), thereby providing an antireflection layer. In that case, when a transparent material layer having a refractive index higher than that of the resin film or transparent substrate is provided between the antireflection layer and the resin film or transparent substrate, the reflectance can be more reduced.

An in-plane aberration of the wavelength plate of the invention is preferably within 30 (m$\lambda$), more preferably within 20 (m$\lambda$), especially preferably within 10 (m$\lambda$), and most preferably within 5 (m$\lambda$). By making the in-plane aberration of the wavelength plate fall within the foregoing range, a good S/N and a tolerable jitter range are obtained, and therefore, such is preferable. Here, $\lambda$ represents a wavelength of monochromic light.

It is preferable that the number of foreign matters in the wavelength plate of the invention is as small as possible. The number of foreign matters having a mean particle size of 10 $\mu$m or more is usually 10/mm$^2$ or less, preferably 5/mm$^2$ or less, and more preferably 1/mm$^2$ or less. When foreign matters of 10 $\mu$m or more are present in the number exceeding 10/mm$^2$ in the wavelength plate, a noise signal becomes large and the S/N ratio becomes small, and therefore, such is not preferable. Here, the foreign matters in the wavelength plate include ones that lower transmission of laser beams and ones that largely change the advance direction of laser beams due to the presence of these foreign matters. Examples of the former include dusts or dirt, resin scorches or metal powders, and powders of minerals, etc.; and examples of the latter include contaminants of other resins and transparent substances having a different refractive index.

For the purpose of shielding or lowering transmission of light other than one having a desired wavelength according to the need such as a reduction of noise, the wavelength plate of the invention may be colored with a known coloring agent, etc.

Since the optical information recording and reproducing device using the wavelength plate of the invention can cope with plural laser optical systems, it is possible to achieve a design corresponding to various modes such as CD-ROM, CD-R, DVD-ROM, DVD-RAM, and MO. That is, with respect to the recording and reproduction of information such as voices, images and computer programs, it is possible to achieve a design such that a single device can be applied to any of a reproduction-only recording medium, a write-once type recording medium, and a rewritable type recording medium. Such an optical information recording and reproducing device can be used for OA instruments, acoustic recording and reproducing devices, image recording and reproducing devices, computer data recording and reproducing devices, game machines, and the like.

EXAMPLES

The invention will be more specifically described below with reference to the Examples, but it should not be construed that the invention is limited to these Examples. Incidentally, in the Examples, all parts and percentages mean parts by weight and % by weight, respectively unless otherwise indicated. Various measurements in the Examples are as follows.

Inherent Viscosity ($[\eta]_{inh}$)

The inherent viscosity was measured by an Ubbelohde's viscometer by using chloroform or cyclohexane as a solvent under conditions at a polymer concentration of 0.5 g/dl and 30° C.

Gel Content 50 g of a hydrogenated (co)polymer was dissolved in chloroform at a temperature of 25° C. such that the concentration became 1%; this solution was filtered using a membrane filter having a pore size of 0.5 $\mu$m, the weight of which had been previously measured (manufactured by Advantec Toyo Kaisha, Ltd.); the filter after filtration was dried; and the gel content was calculated from an increase of its weight.

Hydrogenation Degree

In the case of a hydrogenated homopolymer, $^1$H-NMR was measured at 500 MHz, and the hydrogenation degree was measured from a ratio of absorption intensity between methyl hydrogen of the ester group and olefin-based hydrogen, or a ratio of absorption intensity between paraffin-based hydrogen and olefin-based hydrogen. In the case of a hydrogenated copolymer, the $^1$H-NMR absorption of the copolymer after polymerization and that of the hydrogenated copolymer after hydrogenation were compared, thereby calculating the hydrogenation degree.

Glass Transition Temperature

The glass transition temperature was measured at a temperature-rise rate of 10° C./min in a nitrogen atmosphere by a scanning colorimeter (DSC).

Film Thickness

The film thickness was measured using a laser focal displacement meter, LT-8010, manufactured by Keyence Corporation.

Retardation Value

The retardation value was measured at a wavelength of 480, 550, 590, 630 and 750 nm, respectively using KOBRA-21ADH, manufactured by Oji Scientific Instruments, and with respect to other portions than the foregoing wavelengths, the retardation value was calculated according to the Cauchy dispersion equation using the retardation values at the foregoing wavelengths.

Synthesis Example 1

250 parts of 8-methyl-8-methoxycarbonyltetracyclo [4.4.0.1$^{2,5}$.1$^{7,10}$]-3-dodecene (specific monomer), 27 parts of 1-hexene (molecular weight modifier), and 750 parts of toluene (solvent for ring-opening polymerization reaction) were charged in a reactor which had been purged with nitrogen, and this solution was heated at 60° C. Next, 0.62 parts of a toluene solution of triethylaluminum (1.5 moles/l) as a polymerization catalyst and 3.7 parts of a toluene solution (concentration: 0.05 moles/l) of tungsten hexachloride having been modified with t-butanol and methanol (t-butanol/methanol/tungsten=0.35/0.3/1 by mole) were added to the solution in the reactor, and this system was subjected to ring-opening polymerization reaction by heating and stirring at 80° C. for 3 hours, thereby obtaining a ring-opening polymer solution. In this polymerization system, the polymerization conversion was 97%, and the resulting ring-opening polymer had an inherent viscosity ([η]$_{inh}$), as measured in chloroform at 30° C., of 0.62 dl/g.

4,000 parts of the thus obtained ring-opening polymer solution was charged in an autoclave, 0.48 parts of RuHCl (CO)[P(C$_6$H$_5$)$_3$]$_3$ was added to this ring-opening polymer solution, and the mixture was subjected to hydrogenation reaction by heating and stirring for 3 hours under conditions at a hydrogen gas pressure of 100 kg/cm$^2$ and a reaction temperature of 165° C.

After cooling the resulting reaction solution (hydrogenated polymer solution), the pressure of the hydrogen gas was released. This reaction solution was poured into a large amount of methanol, and a solidified material was separated and recovered, and then dried, thereby obtaining a hydrogenated polymer. This is designated as a resin A.

The hydrogenation degree of the thus obtained hydrogenated polymer was measured using $^1$H-NMR and found to be 99.9%. The glass transition temperature (Tg) of the resin was measured by the DSC method and found to be 165° C. The resin was measured for a number average molecular weight (Mn) and a weight average molecular weight (Mw) as reduced into polystyrene by the GPC method (solvent: tetrahydrofuran). As a result, the number average molecular weight (Mn) was 42,000; the weight average molecular weight (Mw) was 180,000; and the molecular weight distribution (Mw/Mn) was 4.29. The saturated water absorption at 23° C. of the resin was measured and found to be 0.3%. The SP value was measured and found to be 19 (MPa$^{1/2}$). The inherent viscosity ([η]$_{inh}$) in chloroform at 30° C. of the resin was measured and found to be 0.67 dl/g. The gel content was 0.4%.

Synthesis Example 2

A hydrogenated polymer was obtained in the same manner as in Synthesis Example 1, except that 225 parts of 8-methyl-8-methoxycarbonyltetracyclo-[4.4.0.1$^{2,5}$.1$^{7,10}$]-3-dodecene and 25 parts of bicyclo[2.2.1]hept-2-ene were used as specific monomers and that the addition amount of 1-hexene (molecular weight modifier) was changed to 43 parts. The resulting hydrogenated polymer (hereinafter designated as "resin B") had a hydrogenation degree of 99.9%.

Synthesis Example 3

A hydrogenated polymer was obtained in the same manner as in Synthesis Example 1, except that 215 parts of 8-methyl-8-methoxycarbonyltetracyclo-[4.4.0.1$^{2,5}$.1$^{7,10}$]-3-dodecene and 35 parts of bicyclo[2.2.1]hept-2-ene were used as specific monomers and that the addition amount of 1-hexene (molecular weight modifier) was changed to 18 parts. The resulting hydrogenated polymer (hereinafter designated as "resin C") had a hydrogenation degree of 99.9%.

Film Production Example 1

The resin A obtained in Synthesis Example 1 was dissolved in toluene in a concentration of 30% (solution viscosity at room temperature: 30,000 mPa·S), and the solution was coated on a 100 μm-thick PET film (LUMILAR U94, manufactured by Toray Industries, Inc.) the surface of which had been made hydrophilic (easily adhesive) with an acrylic material using an INVEX labocoater, manufactured by Inoue Kinzoku Kogyo Co., Ltd. such that the film thickness after drying was 100 μm, followed by primary drying at 50° C. and then secondary drying at 90° C.

There was thus obtained a resin film A peeled apart from the PET film. The resulting film had an amount of the residual solvent of 0.5%.

This film was determined for a photoelastic coefficient (C$_P$) and a stress-optical coefficient (C$_R$) in the following manners. Specifically, with respect to the photoelastic coefficient (C$_P$), after applying a rectangular sample with several kinds of constant loads at room temperature (25° C.), it was calculated from a generated retardation and a stress which the sample received at that time. With respect to the stress-optical coefficient (C$_R$), after applying a film-like sample with several kinds of constant loads at the Tg or higher and gradually cooling to return to room temperature in the elongated state by several percents, it was calculated from a generated retardation and a stress as applied. As a result, the C$_P$ and the C$_R$ were 4 (×10$^{-12}$ Pa$^{-1}$) and 1,750 (×10$^{-12}$ Pa$^{-1}$), respectively.

In a tenter, this resin film A was heated at 170° C. which is (Tg+5° C.), stretched at a stretching rate of 400%/min and a stretching ratio of 3.0 times, cooled in an atmosphere at 110° C. for about one minute while keeping this state, further cooled to room temperature, and then taken out. As a result, a retardation film A-1 having a retardation of 720 nm at a wavelength of 720 nm could be obtained.

In the foregoing stretching method, the stretching ratio was changed to 2.5 times, whereby a retardation film A-2 having a retardation of 540 nm at a wavelength of 720 nm could be obtained.

In the foregoing stretching method, the stretching ratio was changed to 1.4 times, whereby a retardation film A-3 having a retardation of 180 nm at a wavelength of 720 nm could be obtained.

In the foregoing stretching method, the stretching ratio was changed to 1.8 times, whereby a retardation film A-4 having a retardation of 360 nm at a wavelength of 720 nm could be obtained.

In the retardation films A-1, A-2, A-3 and A-4, all of differences between the retardation at a wavelength of 550 nm and the retardation at a wavelength of 800 nm fell within the range of from 0.90 to 1.00.

The characteristic values of the resin film A are shown in Table 1.

Film Production Example 2

Using the resin B obtained in Synthesis Example 2, a resin film B was obtained in the same manner as in Film Production Example 1. The resulting resin film B had an amount of the residual solvent of 0.5%, a photoelastic coefficient ($C_P$) of 6 ($\times 10^{-12}$ Pa$^{-1}$), and a stress-optical coefficient ($C_R$) of 2,000 ($\times 10^{-12}$ Pa$^{-1}$). Using the resin film B, a retardation film B-1 was obtained in the same manner as in Film Production Example 1, except that the stretching conditions were changed such that the stretching ratio was 2.0 times and that the heating temperature was 145° C. This retardation film B-1 had a retardation of 720 nm at a wavelength of 720 nm.

The stretching ratio was changed to 1.8 times, whereby a retardation film B-2 having a retardation of 540 nm at a wavelength of 720 nm could be obtained.

In the retardation films B-1 and B-2, all of differences between the retardation at a wavelength of 550 nm and the retardation at a wavelength of 800 nm fell within the range of from 0.90 to 1.00.

The characteristic values of the resin film B are shown in Table 1.

Film Production Example 3

Using the resin C obtained in Synthesis Example 3, a resin film C was obtained in the same manner as in Film Production Example 1. The resulting resin film C had an amount of the residual solvent of 0.5%, a photoelastic coefficient ($C_P$) of 9 ($\times 10^{-12}$ Pa$^{-1}$), and a stress-optical coefficient ($C_R$) of 2,350 ($\times 10^{-12}$ Pa$^{-1}$).

Using the resin film C, a retardation film C-1 was obtained in the same manner as in Film Production Example 1, except that the stretching conditions were changed such that the stretching ratio was 1.7 times and that the heating temperature was 130° C. This retardation film C-1 had a retardation of 720 nm at a wavelength of 720 nm.

The stretching ratio was changed to 1.5 times, whereby a retardation film C-2 having a retardation of 540 nm at a wavelength of 720 nm could be obtained.

In the retardation films C-1 and C-2, all of differences between the retardation at a wavelength of 550 nm and the retardation at a wavelength of 800 nm fell within the range of from 0.90 to 1.00.

The characteristic values of the resin film C are shown in Table 1.

TABLE 1

| | Tg (° C.) | $C_P, C_R$ ($\times 10^{-12}$ Pa$^{-1}$) | Thickness (μm) | Amount of residual solvent (%) | Total light transmittance (%) | Retardation at 590 nm (nm) |
|---|---|---|---|---|---|---|
| Resin film A | 165 | 4, 1,750 | 100 | 0.5 | 93 | 6.8 |
| Resin film B | 140 | 6, 2,000 | 100 | 0.5 | 93 | 6.8 |
| Resin film C | 125 | 9, 2,350 | 100 | 0.5 | 93 | 6.8 |
| Polycarbonate film | 155 | 150, 4,700 | 100 | 0.4 | 90 | 25.5 |

Example 1

Respective one sheet of the foregoing retardation films A-1 and A-2 was laminated on the both surfaces of a glass plate (BK7 optical glass) having a refractive index of 1.52 and a thickness of 0.2 mm by using an acrylic adhesive having a thickness of 10 μm such that the respective optical axes (sticking angle) became 115 degrees, thereby obtaining a wavelength plate A-1. Each of linearly polarized light composed of laser beams having a wavelength of 650 nm and linearly polarized light composed of laser beams having a wavelength of 785 nm was made incident vertically into the wavelength plate A-1 at an inclination (polarizing azimuth angle) of 65 degrees against the optical axis of the retardation film A-1 bonded on the wavelength plate A-1. As a result, all of the outgoing lights had an ellipticity of 0.98 or more and became substantially complete circularly polarized light.

Foreign matters of 10 μm or more in the wavelength plate A-1 were observed with transmitted light by using an optical polarizing microscope (OPTIPHOT2-POL, manufactured by Nikon Corporation, objective lens: 20 magnifications, eyepiece: 10 magnifications). As a result, it was confirmed that the number of foreign matter was 10/mm$^2$ or less.

Example 2

A wavelength plate A-2 was obtained in the same manner as in Example 1, except for using the foregoing retardation films A-1 and A-3 and setting up the sticking angle at 52 degrees. Each of linearly polarized light composed of laser beams having a wavelength of 650 nm and linearly polarized light composed of laser beams having a wavelength of 785 nm was made incident into the wavelength plate A-2 at a polarizing azimuth angle of 8 degrees. As a result, all of the outgoing lights had an ellipticity of 0.98 or more and became substantially complete circularly polarized light.

It was confirmed by the same manner as in Example 1 that the number of foreign matters of 10 μm or more in the wavelength plate A-2 was 10/mm² or less.

Example 3

A wavelength plate B was obtained in the same manner as in Example 1, except for using the foregoing retardation films B-1 and B-2. Each of linearly polarized light composed of laser beams having a wavelength of 650 nm and linearly polarized light composed of laser beams having a wavelength of 785 nm was made incident into the wavelength plate B in the same manners as in Example 1. As a result, all of the outgoing lights had an ellipticity of 0.98 or more and became substantially complete circularly polarized light.

It was confirmed by the same manner as in Example 1 that the number of foreign matters of 10 μm or more in the wavelength plate B was 10/mm² or less.

Example 4

A wavelength plate C was obtained in the same manner as in Example 1, except for using the foregoing retardation films C-1 and C-2. Each of linearly polarized light composed of laser beams having a wavelength of 650 nm and linearly polarized light composed of laser beams having a wavelength of 785 nm was made incident into the wavelength plate C in the same manners as in Example 1. As a result, all of the outgoing lights had an ellipticity of 0.98 or more and became substantially complete circularly polarized light.

It was confirmed by the same manner as in Example 1 that the number of foreign matters of 10 μm or more in the wavelength plate C was 10/mm² or less.

Example 5

The wavelength plates A-1, A-2, B and C were each allowed to stand in the environment at a temperature of 90° C. and a humidity of 90% RH for 3,000 hours, and thereafter, a change of the outgoing light was examined. As a result, even after 3,000 hours, the change rates against the initial characteristics were all within 1% so that it was noted that good stability was revealed. In particular, in the wavelength plate A-1, the change rate was within 0.5% so that it was noted that the stability of the characteristics was extremely excellent.

Comparative Example 1

The foregoing laser beams were made incident into each of the foregoing retardation films A-1, B-1 and C-1. As a result, all of the outgoing lights had an ellipticity of not more than 0.5 and were far from circularly polarized light.

Comparative Example 2

A polycarbonate film was obtained in the same manner as in Film Production Example 1, except for using a polycarbonate A2700, manufactured by Idemitsu Petrochemical Co., Ltd. as the raw material and using methylene chloride as the solvent. The characteristic values of this film C are shown in Table 1. Further, in a tenter, this film was heated at 160° C. which is (Tg+5° C.), stretched at a stretching rate of 400%/min and a stretching ratio of 1.4 times, cooled in an atmosphere at 110° C. for about one minute while keeping this state, further cooled to room temperature, and then taken out.

As a result, a polycarbonate-made retardation film D-1 having a retardation of 720 nm at a wavelength of 720 nm could be obtained. A retardation film D-2 of 540 nm was obtained in the same manner by changing the stretching ratio to 1.3 times.

In the retardation films D-1 and D-2, all of differences between the retardation at a wavelength of 550 nm and the retardation at a wavelength of 800 nm were 0.89.

A wavelength plate D-1 was obtained in the same manner as in Example 1, except for using the retardation films D-1 and D-2.

Using this wavelength plate D-1, the both lasers were transmitted in the same manner as in Example 1. The outgoing lights had an ellipticity of 0.94 and were slightly deviated from ideal circularly polarized light (ellipticity=1). Further, the durability was evaluated in the same manner as in Example 5. As a result, the durability was changed by 20% at maximum against the initial characteristics so that it was noted that there was a problem in the durability.

Example 6

A wavelength plate A-3 was obtained in the same manner as in Example 1, except for using the foregoing retardation films A-1 and A-4 and setting up the sticking angle at 58 degrees. Each of linearly polarized light composed of laser beams having a wavelength of 650 nm and linearly polarized light composed of laser beams having a wavelength of 785 nm was made incident vertically into the wavelength plate A-3 at a polarizing azimuth angle of 14 degrees. As a result, all of the outgoing lights became substantially complete linearly polarized light having an ellipticity of not more than 0.05. The angle of the incident polarized light was 89 to 91 degrees so that well conversion could be achieved.

It was confirmed by the same manner as in Example 1 that the number of foreign matters of 10 μm or more in the wavelength plate A-3 was 10/mm² or less.

Example 7

The wavelength plate A-3 was allowed to stand in the environment at a temperature of 90° C. and a humidity of 90% RH for 3,000 hours, and thereafter, a change of the outgoing light was examined. As a result, even after 3,000 hours, the change rate against the initial characteristics was within 0.5% so that it was noted that good stability was revealed.

Comparative Example 3

A polycarbonate-made retardation film D-3 having a retardation of 360 nm at a wavelength of 720 nm could be obtained in the same manner as in Comparative Example 2, except for changing the stretching ratio to 1.2 times.

In the retardation film D-3, a difference between the retardation at a wavelength of 550 nm and the retardation at a wavelength of 800 nm were 0.89.

A wavelength plate D-2 was obtained in the same manner as in Example 6, except for using the retardation films D-1 and D-3.

Using this wavelength plate D-2, the both lasers were transmitted in the same manner as in Example 6. The outgoing lights had an ellipticity of 0.15 at minimum and were largely deviated from linearly polarized light. The incident polarized light angle was 82 degrees and was largely deviated from 90 degrees as an ideal value. Further, the durability was evaluated in the same manner as in Example 7. As a result, the durability was changed by 16% at maximum against the initial characteristics so that it was noted that there was a problem in the durability.

INDUSTRIAL APPLICABILITY

The wavelength plate of the invention is a wavelength plate having the same polarizing characteristics against monochromic lights having a different wavelength, which is obtained by combining plural sheets of a retardation film that provides a specific retardation. Further, by using a retardation film made of a cyclic olefin based resin-containing material as the retardation film, it is possible to obtain a wavelength plate having excellent durability. Optical information recording and reproducing devices using the wavelength plate of the invention can be applied to any of a reproduction-only recording medium, a write-once type recording medium, and a rewritable type recording medium regarding recording of information such as the foregoing voices and images and can be used for recording devices such as CD-ROM, CD-R, and rewritable DVD and OA instruments using the same, acoustic reproducing devices such as CD, image reproducing devices such as DVD and AV instruments using the same, game machines, and the like.

The invention claimed is:

1. A wavelength plate having the same polarizing characteristics against monochromic lights having a different wavelength, which is obtained by laminating a retardation film (A) that provides a retardation of $(1+X)\lambda$ to light having a wavelength $\lambda$ (nm) as defined according to the following expression (1) as an essential component and a retardation film (B) that provides a retardation of $(\frac{1}{4}+Y/2)\lambda$ or a retardation film (C) that provides a retardation of $(\frac{1}{2}+Z)\lambda$, wherein X, Y, and Z each independently represent 0 or an integer between 1 and 10 such that an optical axis of the retardation film (B) or retardation film (C) intersects with an optical axis of the retardation film (A):

$$[(\lambda S+\lambda L)/2]-200 \leq \lambda \leq [(\lambda S+\lambda L)/2]+200 \quad (1)$$

λS: wavelength (nm) of monochromic light in the shortest wavelength side; and

λL: wavelength (nm) of monochromic light in the longest wavelength side, wherein each of the retardation films (A), (B), and (C) (i) comprises a cyclic olefin based resin-containing material, and (ii) has a ratio (Re800/Re550) of a retardation (Re800) in light having a wavelength of 800 nm to a retardation (Re550) in light having a wavelength of 550 nm of from 0.90 to 1.05.

2. The wavelength plate according to claim 1, wherein the retardation films are bonded to a transparent support.

3. The wavelength plate according to claim 2, wherein the cyclic olefin based resin is at least one member selected from the group consisting of (1) a ring-opening polymer of a specific monomer represented by the following general formula (1); (2) a ring-opening copolymer of a specific monomer represented by the following formula (1) and a copolymerizable monomer; (3) a hydrogenated (co)-polymer of the foregoing ring-opening (co)polymer (1) or (2); (4) a (co)polymer resulting from cyclization of the foregoing ring-opening (co) polymer (1) or (2) by the Friedel-Crafts reaction and then hydrogenation; (5) a saturated copolymer of a specific monomer represented by the following formula (1) and an unsaturated double bond-containing compound; and (6) an addition type (co)polymer of at least one monomer selected from a specific monomer represented by the following formula (1), a vinyl based cyclic hydrocarbon based monomer and a cyclopentadiene based monomer, and a hydrogenated (co) polymer thereof:

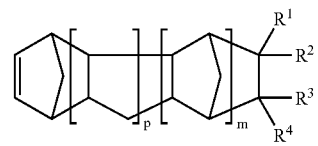

Formula (1)

wherein R1 to R4 each represent a hydrogen atom, a halogen atom, a hydrocarbon group having from 1 to 30 carbon atoms, or other monovalent organic group, and may be the same or different; R1 and R2, or R3 and R4 may be taken together to form a divalent hydrocarbon group; R1 or R2 and R3 or R4 may be bonded to each other to form a monocyclic or polycyclic structure; m represents 0 or a positive integer; and p represents 0 or a positive integer.

4. The wavelength plate according to claim 1, wherein the retardation films A, B, and C have a photoelastic coefficient (Cp) is from 0 to 100 ($\times 10^{-12}$ $Pa^{-1}$) and a stress-optical coefficient (CR) is from 1,500 to 4,000 ($\times 10^{-12}$ $Pa^{-1}$).

5. The wavelength plate according to claim 1, wherein the retardation films A, B, and/or C are obtained by laminating a plurality of respective retardation films A, B, and/or C, while keeping optical axes of the plurality of the respective retardation films parallel.

6. A wavelength plate having a function as a quarter wavelength plate or a half wavelength plate against monochromic lights having a different wavelength used in a single optical information recording and reproducing device, wherein the plate is obtained by laminating a retardation film (A) that provides a retardation of $(1+X)\lambda$ to light having a wavelength X (nm) as defined according to the following expression (1) as an essential component and a retardation film (B) that provides a retardation of $(\frac{1}{4}Y/2)\lambda$ or a retardation film (C) that provides a retardation of $(\frac{1}{2}Z)\lambda$ wherein X is 0, Y is 0 or 1, and Z is 0, such that an optical axis of the retardation film (B) or retardation film (C) intersects with an optical axis of the retardation film (A):

$$[(\lambda S+\lambda L)/2]-200 \leq \lambda \leq [(\lambda S+\lambda L)/2]+200 \quad (1),$$

λS: wavelength (nm) of monochromic light that lies in the shortest wavelength side among monochromic lights having different wavelengths used in the single optical information recording and reproducing device; and λL: wavelength (nm) of monochromic light that lies in the longest wavelength side among monochromic lights having different wavelengths used in the single optical information recording and reproducing device, wherein each of the retardation films (A), (B), and (C) (i) comprises a cyclic olefin based resin, and (ii) has a ratio (Re800/Re550) of a retardation (Re800) in light having a wavelength of 800 nm to a retardation (Re550) in light having a wavelength of 550 nm of from 0.90 to 1.05.

* * * * *